US007882244B2

(12) United States Patent
Helvick

(10) Patent No.: US 7,882,244 B2
(45) Date of Patent: Feb. 1, 2011

(54) METHOD AND SYSTEM FOR FACILITATING GROUP ORGANIZATION USING MOBILE DEVICES

(75) Inventor: Richard Eric Helvick, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 309 days.

(21) Appl. No.: 12/148,809

(22) Filed: Apr. 23, 2008

(65) Prior Publication Data

US 2009/0271519 A1 Oct. 29, 2009

(51) Int. Cl.
*G06F 15/16* (2006.01)

(52) U.S. Cl. ..................... 709/227; 455/41.2

(58) Field of Classification Search ......... 709/200–202, 709/217–227, 228; 455/41.1, 41.2
See application file for complete search history.

(56) References Cited

U.S. PATENT DOCUMENTS

| 6,370,566 B2 | 4/2002 | Discolo et al. ............. 709/206 |
| 2004/0082351 A1 | 4/2004 | Westman ................... 455/518 |
| 2005/0101314 A1 | 5/2005 | Levi .......................... 455/423 |
| 2007/0019616 A1 | 1/2007 | Rantapuska et al. ......... 370/352 |
| 2007/0085662 A1 | 4/2007 | Matsumoto et al. ........ 340/10.1 |
| 2007/0263560 A1 | 11/2007 | Saarisalo et al. ............ 370/328 |
| 2007/0265033 A1 | 11/2007 | Brostrom .................... 455/557 |
| 2008/0219227 A1* | 9/2008 | Michaelis ................... 370/338 |
| 2008/0222711 A1* | 9/2008 | Michaelis ...................... 726/7 |

FOREIGN PATENT DOCUMENTS

JP 2007-183754 7/2007

OTHER PUBLICATIONS

M. Hamatsu, T. Sato and E. Yano, "Development of Telephone Book Keeping Service," NTT DoCoMo, vol. 14, No. 2, Jul. 2006.

* cited by examiner

*Primary Examiner*—Moustafa M Meky
(74) *Attorney, Agent, or Firm*—Scot A. Reader

(57) ABSTRACT

Method and system for facilitating group organization using mobile devices and near field communication (NFC). Such a method in one aspect comprises the steps of selecting a first member of a group to create resources for the group, creating the resources by the first member using a mobile device belonging to the first member, bringing the mobile device belonging to the first member and a mobile device belonging to a second member of the group into proximity whereby a NFC connection is established between the mobile devices, uploading from the mobile device belonging to the second member to the mobile device belonging to the first member via the NFC connection information about the second member and adding the information about the second member to the resources.

19 Claims, 4 Drawing Sheets

US 7,882,244 B2

METHOD AND SYSTEM FOR FACILITATING GROUP ORGANIZATION USING MOBILE DEVICES

BACKGROUND OF THE INVENTION

The present invention relates to group organization and, more particularly, to a method and system for invoking mobile devices to facilitate group organization.

In sociological terms, a group consists of people with a shared identity and/or interests who interact with one another and assume obligations as members of the group. Most groups need a certain level of organization in order to perform these basic group functions. Such organization may include, for example, creating a group mission statement, membership roster, calendar of events and communication means.

The Internet has greatly facilitated group organization. In one conventional approach to invoking the Internet for group organization, a group selects one of its members to create a web presence for the group. The selected member reserves a Uniform Resource Identifier (URI), creates a website with group resources such as a mission statement, calendar of events and web log and pays a web hosting service to host the website. A link to the website is then distributed to members of the group in a presentation, flyer or email, or by word of mouth or other means. Members then can register with the website at their convenience by navigating to the website and entering member information into a web form, which often includes selection of a password. After registering, members can use group resources on the website.

Unfortunately, conventional approaches to invoking the web to facilitate group organization are cumbersome. There is a substantial time lag between the decision to create a web presence for the group and the establishment of the web presence. Members may not be properly informed of the website once established. Even where properly informed, members may forget or not take the time to register. And even where members register, they may forget their password and have to engage in a password recovery process before they can use the group resources.

SUMMARY OF THE INVENTION

The present invention, in a basic feature, provides a method and system for facilitating group organization using mobile devices and near field communication (NFC).

In one aspect of the invention, a method for facilitating organization of a group using mobile devices and NFC comprises the steps of selecting a first member of a group to create resources for the group, creating the resources by the first member using a mobile device belonging to the first member, bringing the mobile device belonging to the first member and a mobile device belonging to a second member of the group into proximity whereby a NFC connection is established between the mobile devices, uploading from the mobile device belonging to the second member to the mobile device belonging to the first member via the NFC connection information about the second member and adding the information about the second member to the resources.

In some embodiments, the method further comprises the steps of downloading from the mobile device belonging to the first member to the mobile device belonging to the second member via the NFC connection information about the group.

In some embodiments, the resources for the group comprise one or more of a web page, web log or Wikipedia entry for the group.

In some embodiments, the information about the second member comprises one or more of a name, mobile device identifier, street address, email address, phone number or password for the second member.

In some embodiments, the information about the group comprises a link to the resources for the group.

In some embodiments, the creating step comprises interacting with a group management system hosted on a server using a client application executing on the mobile device belonging to the first member.

In some embodiments, the creating step comprises interacting with a group management application executing on the mobile device belonging to the first member.

In some embodiments, the creating step comprises attempting to interact with a group management system hosted on a web server using a web browser executing on the mobile device belonging to the first member and, after a failed attempt, interacting with a group management application executing on the mobile device belonging to the first member.

In some embodiments, the creating step comprises setting permissions for the group.

In some embodiments, the NFC connection has an operating distance of less than twenty centimeters.

In another aspect of the invention, a mobile device belonging to a first member of a group selected to create resources for the group comprises a NFC interface, a user interface and a processor communicatively coupled with the NFC interface and the user interface, wherein under control of the processor the mobile device belonging to the first member creates the resources based at least in part on information about the group input by the first member on the user interface and adds to the resources information about at least a second member of the group uploaded via the NFC interface over a NFC connection established with a mobile device belonging to the second member.

In some embodiments, under control of the processor the mobile device belonging to the first member downloads to the mobile device belonging to the second member via the NFC interface information about the group.

In some embodiments, the mobile device belonging to the first member further comprises a wireless network interface communicatively coupled with the processor and under control of the processor the mobile device belonging to the first member interacts with a group management system via the wireless network interface to create the resources.

In some embodiments, under control of the processor the mobile device belonging to the first member interacts with a group management application executing on the mobile device belonging to the first member to create the resources.

In some embodiments, the mobile device belonging to the first member further comprises a wireless network interface communicatively coupled with the processor and under control of the processor the mobile device belonging to the first member attempts to interact with a group management system via the wireless network interface and after a failed attempt interacts with a group management application executing on the mobile device belonging to the first member to create the resources.

In yet another aspect of the invention, a mobile device belonging to a second member of a group having resources created by a first member of the group comprises a NFC interface and a processor communicatively coupled with the NFC interface, wherein in response to a request received via the NFC interface over a NFC connection established with a mobile device belonging to the first member the mobile device belonging to the second member uploads via the NFC interface information about the second member for addition to the resources.

In some embodiments, the mobile device belonging to the second member receives via the NFC interface over the NFC connection information about the group.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
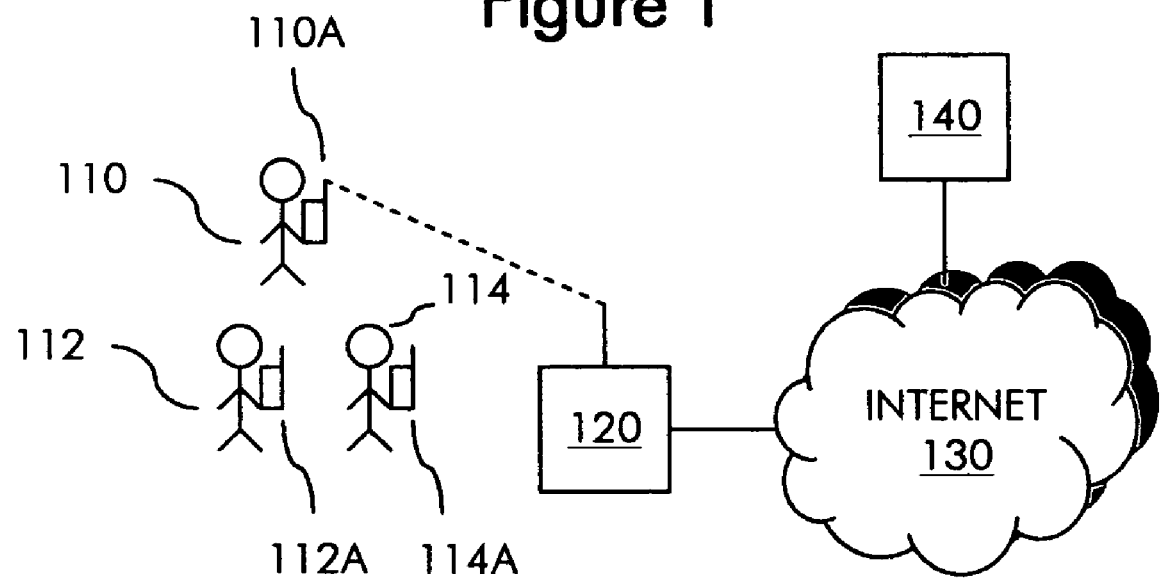
FIG. 1 shows a communication system.

FIG. 1 shows a communication system in some embodiments of the invention. The communication system includes a plurality of human members 110, 112, 114 of a group who have gathered together. The group may have spontaneously formed at the gathering or may have formed at an earlier time. Members 110, 112, 114 possess respective Internet-capable mobile devices 110A, 112A, 114A that belong to the respective members 110, 112, 114. Mobile devices 110A, 112A, 114A may be, for example, cell phones, personal data assistants (PDA) or notebook computers.

In operation, members 110, 112, 114 select a member 110 from their ranks to create web resources for the group. Selected member 110 establishes using his or her mobile device 110A a wireless communication link to an access device 120, which may be a cellular base station, an IEEE 802.11 (WiFi) access point or an IEEE 802.16 (WiMAX) base station, for example, that has an uplink to the Internet 130. Selected member 110 using a web browser on mobile device 110A then navigates to a group resource creation web page hosted on web server 140 and interacts with a group management system hosted on web server 140 to establish resources for the group on web server 140. The group resources may include, for example, a group name, web page, web log and/or Wikipedia entry for the group created through interaction of selected member 110 with the group management system. Selected member 110 may also as part of the interaction set permissions for the group, for example, the conditions under which new members can be added. The group management system transmits a group identifier to mobile device 110A that provides a link to the group resources. The group identifier may be, for example, a Uniform Resource Identifier (URI) of the group web page or a unique alphanumeric code that can be used access the group web page from another web page or via other means. Information flows between mobile device 110A and web server 140 may be encrypted to protect the privacy of the exchanged information.

Figure 2:
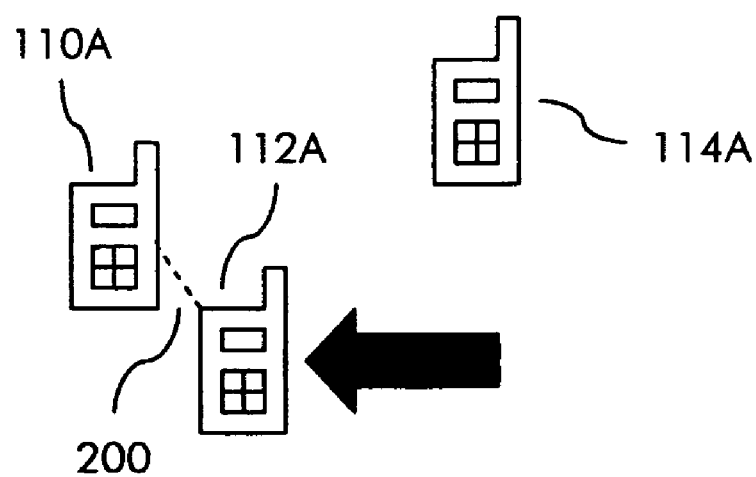
FIG. 2 shows a mobile device belonging to a first member of a group and a mobile device belonging to a second member of the group brought into proximity whereby a NFC connection is established between the mobile devices.

Once the group resources have been created on web server 140 and the group identifier has been received by mobile device 110A, mobile device 110A establishes NFC connections, in turn, with mobile devices 112A, 114A belonging to members 112, 114 who were not selected to create resources for the group for the purpose of exchanging information pertinent to group membership. FIG. 2 shows mobile device 110A and mobile device 112A brought into proximity, whereby a NFC connection 200 is established between mobile devices 110A, 112A. When mobile devices 110A, 112A are brought into proximity, either by moving mobile device 110A near mobile device 112A or moving mobile device 112A near mobile device 110A, NFC units on mobile devices 110A, 112A establish NFC connection 200 using an NFC protocol. Once NFC connection 200 is established, information about non-selected member 112 is uploaded from mobile device 112A to mobile device 110A via NFC connection 200. Uploaded information about non-selected member 112 includes information from a member profile stored on mobile device 112A, such as a name, mobile device identifier, street address, email address, phone number and/or a password for the non-selected member. Additionally, information about the group is downloaded from mobile device 110A to mobile device 112A via NFC connection 200. Downloaded information about the group includes the group identifier received by mobile device 110A while interacting with the group management system attendant to creating the group resources, which enables mobile device 112A to access the group resources.

After the information exchange, NFC connection 200 is terminated either by moving mobile devices 110A, 112A out of proximity from one another or on command of mobile device 110A. Mobile device 110A and mobile device 114A that belongs to non-selected member 114 are then brought into proximity whereby a NFC connection is established between mobile devices 110A, 114A for similar information exchange.

While the group described in FIGS. 1 and 2 has three members, a group operating within the invention may have two or more members including one selected member and one or more non-selected members, wherein a mobile device belonging to the selected member and mobile devices belonging to the non-selected members of the group are brought in proximity for information exchange over NFC connections.

Mobile device 110A transmits to the group management system on web server 140 the information about non-selected members 112, 114 that was uploaded via the NFC connections made with mobile devices 112A, 114A. Mobile device 110A also transmits to the group management system information from its own member profile. The member information may be encrypted to protect the privacy of the member information during transmission. The group management system adds the member information to the resources for the group earlier created on web server 140. The member information may thereafter be used, for example, to create a contact list for the purpose of notifying members of the group of events that are of interest to the group. The member information may also be used to authenticate subsequent access attempts by members of the group. For example, when a member of the group attempts to access the group resources, the group management system may require verification of one or more of a name, mobile device identifier or password provided in the access attempt against the member information stored on web server 140 before allowing access to the group resources. In some embodiments, the mobile device belonging to the member provides the required member information without member intervention so that the member does not have to remember or input it.

In other embodiments, a selected member may invoke a client application other than a web browser to facilitate group organization. For example, a mobile device belonging to the selected member may support a client application that is dedicated to facilitating group organization through interaction with a remote group management system.

Figure 3:
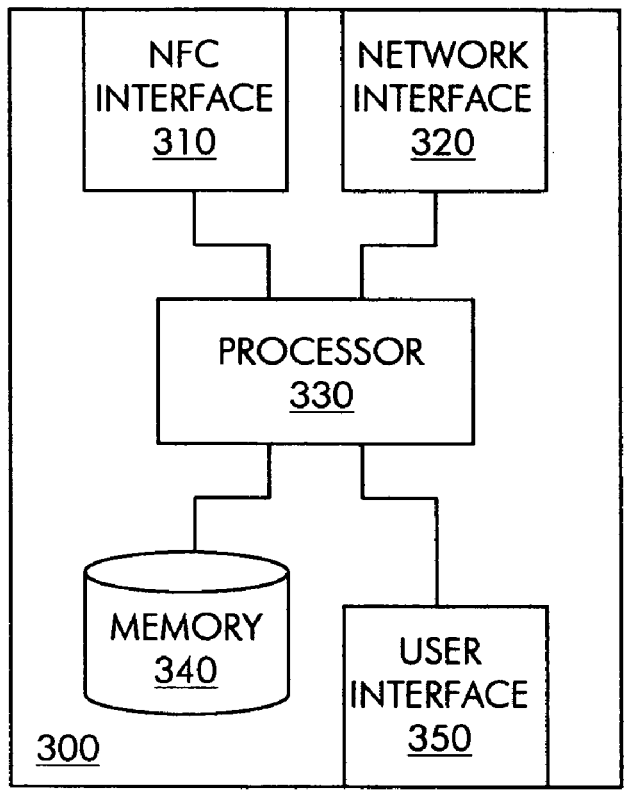
FIG. 3 shows hardware elements of a mobile device in more detail.

FIG. 3 shows hardware elements of a mobile device 300 that is representative of mobile devices 110A, 112A, 114A. Mobile device 300 has a NFC interface 310, wireless network interface 320, memory 340 and user interface 350, all of which are communicatively coupled with a processor 330.

NFC interface 310 is a very short range wireless communication interface for transmitting and receiving information to/from other mobile devices that have NFC interfaces while such mobile devices are in proximity with mobile device 110A. In some embodiments, NFC interface 310 operates in the radio frequency (RF) band at or near 13.56 MHz at a speed of between 106 and 424 kilobits per second over an operating distance of less than twenty centimeters.

Wireless network interface 320 is a communication interface for transmitting and receiving information to/from access devices over wireless communication links. Wireless interface 320 may be, for example, a cellular network interface, a WiFi interface or a WiMAX interface.

Figure 4:
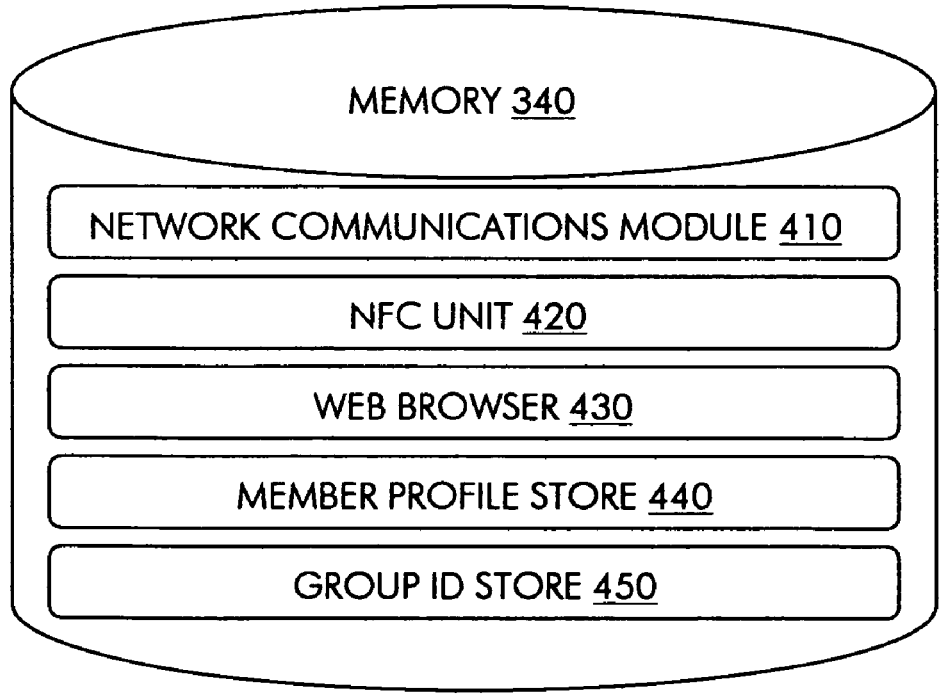
FIG. 4 shows software elements of a mobile device in more detail.

Processor 330 executes in software operations supported by mobile device 300. Turning to FIG. 4, software elements of mobile device 300 that are executable by processor 330 are shown to include a network communications module 410, NFC unit 420 and web browser 430. Memory 340 stores the software elements that are executable by processor 330. Memory 340 also includes a member profile store 440 and group identifier store 450 that store a member profile and a group identifier, respectively. Memory 340 includes one or more random access memories (RAM) and one or more read only memories (ROM).

Network communications module 410 establishes, tears-down and manages wireless communication links with access devices via wireless network interface 320. When mobile device 300 belongs to a member of a group who has been selected to create resources for the group, such links are used to interact with a group management system on a web server to create and update group resources and receive a group identifier.

NFC unit 420 establishes, tears-down and manages NFC connections to other mobile devices via NFC interface 310. When mobile device 300 belongs to a member of a group who has been selected to create resources for the group, NFC unit 420 operates as an initiator device that requests on NFC connections established with mobile devices belonging to non-selected members information about the non-selected members. NFC unit 420 in that event also controls the terms of information exchange, including choosing an initial communication speed and a communication mode. On the other hand, when mobile device 300 belongs to a non-selected member, NFC unit 420 operates as a target device that responds to requests received on NFC connections established with a mobile device that belongs to the selected member for information about the non-selected member under terms of information exchange controlled by the mobile device belonging to the selected member. NFC unit 420 implements a modulation and bit encoding scheme that depends on the speed and terminates NFC connections on command or when mobile device 300 is no longer in proximity with a mobile device to which a NFC connection had been established. NFC unit 420 supports an active communication mode in which the initiator device and the target device each generate their own RF field to transmit information on NFC connections, and also supports a passive communication mode in which the initiator device generates an RF field while the target device uses load modulation to transfer information. NFC unit 420 implements a listen before talk policy in which mobile device 300 listens on the carrier frequency before transmitting and starts transmitting only if no other device is detected transmitting.

Web browser 430 requests download of web pages in response to inputs on user interface 350, renders downloaded web pages on user interface 350 and, when mobile device 300 belongs to a member of a group who has been selected to create resources for the group, supports interaction of the selected member with a group management system hosted on a web server.

Member profile 440 is a data store that stores information about a member of a group to whom mobile device 300 belongs, such as a name, mobile device identifier, street address, email address, phone number and/or password for the member. When mobile device 300 belongs to a member of a group who has been selected to create resources for the group, information from member profile 440 is uploaded directly from mobile device 300 to a web server. On the other hand, when mobile device 300 belongs to a member of a group who has not been selected to create resources for the group, information from member profile 440 is first uploaded to the mobile device that belongs to the selected member over an NFC connection and then subsequently uploaded to the web server.

Group identifier store 450 is a data store that stores an identifier of a group that provides a link to resources of a group to which mobile device 300 belongs. The group identifier may be, for example, a URI of a group web page or an alphanumeric code that can be used access a group web page from another web page or via other means. When mobile device 300 belongs to a member of group who has been selected to create resources for the group, the group identifier is downloaded from a web server and stored in group identifier store 450 attendant to creating the group resources. When mobile device 300 belongs to a member of a group who has not been selected to create resources for the group, the group identifier is downloaded from a mobile device that belongs to the selected member over an NFC connection and stored in group identifier store 450.

User interface 350 receives inputs from a member of a group to whom mobile device 300 belongs via one or more input devices and displays outputs to the member via one or more output devices. Output devices include a display, such as a liquid crystal display (LCD), organic light emitting diode (OLED) display capable of rendering web pages. Input devices include, for example, a finger or stylus-operated touch screen, a scroll wheel or ball, a keypad and/or voice command module, capable of navigating to web pages and manipulating web pages rendered on the display. When mobile device 300 belongs to a member of a group who has been selected to create resources for the group, web pages rendered on the display include a group resource creation web page downloaded from a web server.

Figure 5:
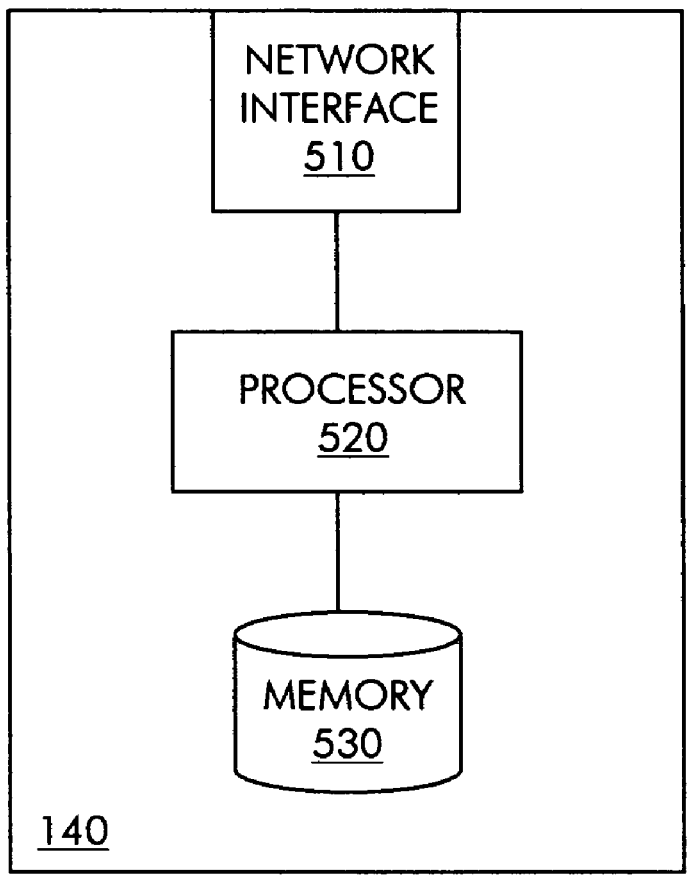
FIG. 5 shows hardware elements of a web server in more detail.

FIG. 5 shows hardware elements of web server 140. Web server 140 includes a network interface 510 and a memory 530, both of which are communicatively coupled with a processor 520.

Network interface 510 is a communication interface for transmitting and receiving data over the Internet 130. Network interface 510 may be, for example, an IEEE 802.3 (Ethernet) interface.

Figure 6:
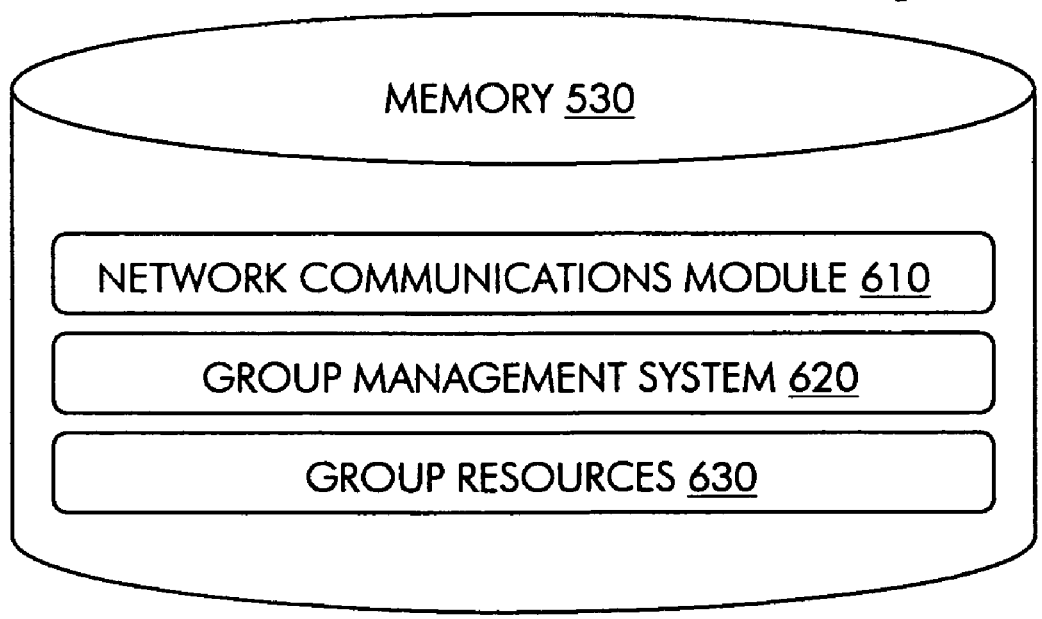
FIG. 6 shows software elements of a web server in more detail.

Processor 520 executes in software operations supported by web server 140. Turning to FIG. 6, software elements of web server 140 executable by processor 520 are shown to include a network communications module 610 and a group management system 620. Memory 530 stores software elements executable by processor 520. Memory 530 also includes group resources 630. Memory 530 includes one or more RAM and one or more ROM.

Network communications module 610 establishes, tears-down and manages information flows over Internet 130 via network interface 510. Such flows include interactive information flows between a mobile device that belongs to a member of a group who has been selected to create resources for the group and group management system 620 in which group resources 630 are created and/or updated.

Group management system 620 interacts with a mobile device that belongs to a member of a group who has been selected to create resources for the group in order to create and update group resources 630. Such interaction includes creating and updating group resources 630 using information about the group and its members received from the mobile device. Group management system 620 also downloads a group identifier to the mobile device for use by the mobile device and distribution by the mobile device to other mobile devices belonging to members of the group who have not been selected to create resources for the group, allowing the non-selected members to access group resources 630.

Group resources 630 include, for example, a name, web page, web log and/or Wikipedia entry for the group established using inputs received from the selected member on a group resource creation web page rendered on the mobile device that belongs to the selected member. Group resources 630 also include information from member profiles of non-selected members acquired over NFC connections by the mobile device belonging to the selected member, as well as information from the member profile of the selected member.

Figure 7:
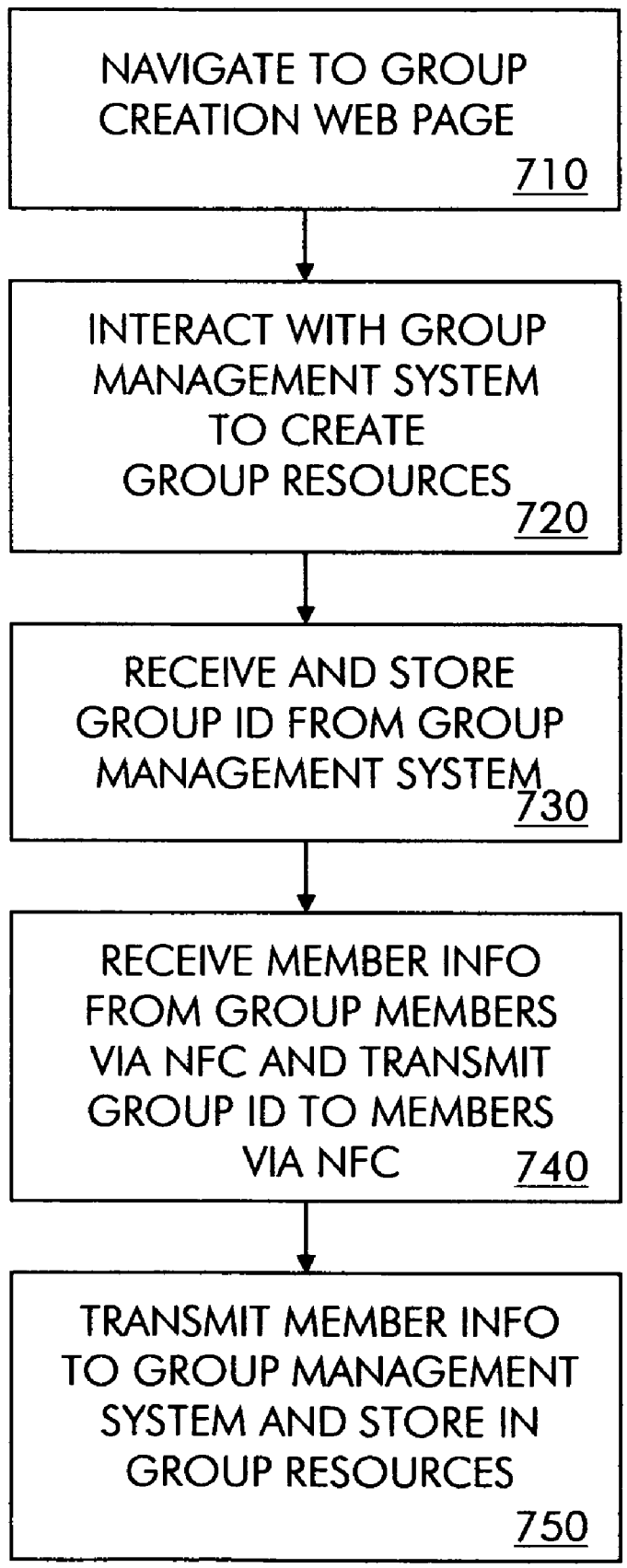
FIG. 7 shows a method for facilitating group organization using mobile devices and NFC.

FIG. 7 shows a method for facilitating group organization using mobile devices and NFC. The flow is described by reference to interaction between mobile device 300 and web server 140 wherein it is presumed that mobile device 300 belongs to a member of a group who has been selected to create resources for the group. Through inputs on user interface 350, the selected member invokes web browser 430 and navigates to a group resource creation web page hosted on web server 140 (710). Through inputs on user interface 350 into the group resource creation web page, the selected member interacts with group management system 620 hosted on web server 140 to create group resources 630 (720). Group management system 620 then downloads a group identifier to mobile device 300 that is stored in group identifier store 450 (730) and provides a link to group resources 630. Next, mobile device 300 establishes NFC connections, in turn, with mobile devices belonging to other members of the group who were not selected to create resources for the group for the purpose of exchanging information pertinent to group membership (740). The information exchanged over NFC includes information from member profiles stored on the mobile devices of the non-selected members and uploaded to mobile device 300 and the group identifier from group identifier store 450 downloaded from mobile device 300. Mobile device 300 transmits to group management system 620 the information from member profiles of the non-selected members, as well as member information from the member profile of the selected member stored in member profile store 440, whereupon group management system 620 adds the information to group resources 630 (750).

In other embodiments of the invention, the mobile device that belongs to a member of a group who has been selected to create resources for the group has a group management application executable thereon. In these embodiments, the selected member invokes the group management application on the mobile device to locally create group resources that are locally stored on the mobile device in association with a locally assigned group identifier that provides a link to the group resources. The mobile device then establishes NFC connections, in turn, with mobile devices belonging to other members of the group who were not selected to create resources for the group for the purpose of uploading information from member profiles of the non-selected members and downloading the locally assigned group identifier. The group management application adds the uploaded information from member profiles of the non-selected members, as well as member information from the member profile of the selected member to the locally created and locally stored group resources.

In still other embodiments, the selected member first invokes a web browser on the mobile device belonging to the selected member in an attempt to access a group management system on a web server and, after one or more failed attempts, invokes the group management application on the mobile device to locally create and update group resources as described in the preceding paragraph.

In still other embodiments, the mobile device thereafter continually attempts to access the group management system on the web server and, upon achieving access, uploads the locally created and stored group resources to the web server whereupon the group resources are made accessible using the locally assigned group identifier.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A method for facilitating organization of a group using mobile devices and near field communication (NFC), comprising the steps of:

creating a web page for the group using a mobile device belonging to a first member of the group;

bringing the mobile device belonging to the first member and a mobile device belonging to a second member of the group into proximity whereby a NFC connection is established between the mobile devices;

downloading a link to the web page from the mobile device belonging to the first member to the mobile device belonging to the second member via the NFC connection; and accessing the web page by the mobile device belonging to the second member using the link.

2. The method of claim 1, further comprising the steps of:

uploading authentication information for the second member from the mobile device belonging to the second member to the mobile device belonging to the first member via the NFC connection; and regulating access of the mobile device belonging to the second member to the web page using the authentication information.

3. The method of claim 2, wherein the method further comprises the step of uploading the authentication information for the second member from the mobile device belonging to the first member to a server.

4. The method of claim 1, wherein the creating step comprises interacting with a group management system hosted on a server to create the web page using a client application executing on the mobile device belonging to the first member.

5. The method of claim 4, wherein the client application is a web browser.

6. The method of claim 1, wherein the creating step comprises interacting with a group management application executing on the mobile device belonging to the first member to create the web page.

7. The method of claim 1, wherein the creating step comprises attempting to interact with a group management system hosted on a server to create the web page using a client application executing on the mobile device belonging to the first member and, after a failed attempt, interacting with a group management application executing on the mobile device belonging to the first member to create the web page.

8. The method of claim 1, wherein the link comprises a uniform resource identifier (URI) of the web page.

9. A mobile device belonging to a first member of a group, comprising:
   a NFC interface;
   a user interface; and
   a processor communicatively coupled with the NFC interface and the user interface, wherein under control of the processor the mobile device belonging to the first member creates a web page for the group based at least in part on information about the group input by the first member on the user interface and downloads a link to the web page to a mobile device belonging to a second member of the group via the NFC interface over a NFC connection established between the mobile device belonging to the first member and the mobile device belonging to the second member.

10. The mobile device belonging to the first member of claim 9, wherein under control of the processor the mobile device belonging to the first member uploads authentication information for the second member from the mobile device belonging to the second member via the NFC connection.

11. The mobile device belonging to the first member of claim 10, wherein under control of the processor the mobile device belonging to the first member uploads the authentication information for the second member to a server.

12. The mobile device belonging to the first member of claim 9, further comprising a wireless network interface communicatively coupled with the processor wherein under control of the processor the mobile device belonging to the first member interacts via the wireless network interface with a group management system hosted on a server to create the web page using a client application executing on the mobile device belonging to the first member.

13. The mobile device belonging to the first member of claim 12, wherein the client application is a web browser.

14. The mobile device belonging to the first member of claim 9, wherein under control of the processor the mobile device belonging to the first member executes a group management application to create the web page.

15. The mobile device belonging to the first member of claim 9, further comprising a wireless network interface communicatively coupled with the processor wherein under control of the processor the mobile device belonging to the first member attempts to interact via the wireless network interface with a group management system hosted on a server to create the web page using a client application executing on the mobile device belonging to the first member and, after a failed attempt, executes a group management application to create the web page.

16. The mobile device belonging to the first member of claim 9, wherein the link comprises a URI of the web page.

17. A mobile device belonging to a second member of a group, comprising:
   a NFC interface; and
   a processor communicatively coupled with the NFC interface; and
   a wireless network interface, wherein under control of the processor the mobile device belonging to the second member downloads a link to a web page created for the group from a mobile device belonging to a first member of the group via the NFC interface over a NFC connection established between the mobile device belonging to the first member and the mobile device belonging to the second member and accesses the web page via the wireless network interface using the link.

18. The mobile device belonging to the second member of claim 17, wherein under control of the processor the mobile device belonging to the second member uploads authentication information for the second member to the mobile device belonging to the first member via the NFC connection.

19. The mobile device belonging to the second member of claim 18, wherein access of the mobile device belonging to the second member to the web page is regulated using the authentication information.

\* \* \* \* \*